Jan. 27, 1959 R. THREADGOLD 2,870,963
ADDING ARRANGEMENTS
Filed March 8, 1956
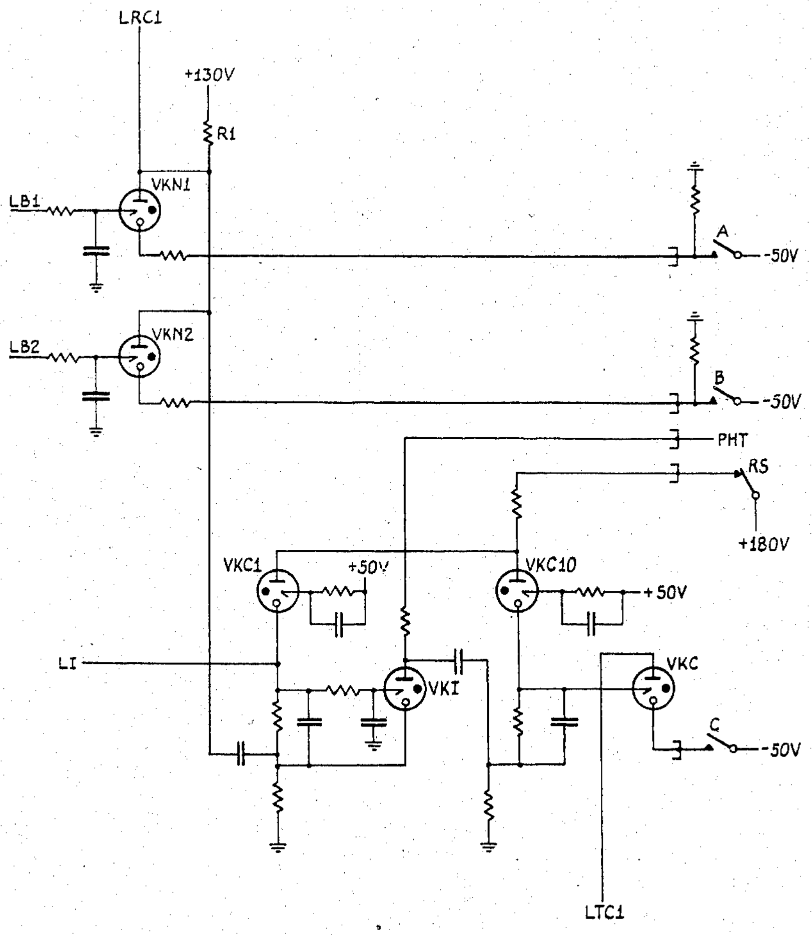
Inventor
RONALD THREADGOLD
By Young, Emery & Thompson
Attorneys United States Patent Office 2,870,963

Patented Jan. 27, 1959

2,870,963

ADDING ARRANGEMENTS

Ronald Threadgold, Liverpool, England, assignor to Automatic Telephone & Electric Company Limited, Liverpool, England, a British company Application March 8, 1956, Serial No. 570,368

Claims priority, application Great Britain March 24, 1955

1 Claim. (Cl. 235—61)

The present invention relates to circuit arrangements for performing the process of addition of two binary numbers.

Circuits for the addition of binary numbers are well known and usually employ a number of thermionic tubes. The object of the present invention is to provide such circuit arrangements which employ only gas discharge tubes of the cold cathode type.

According to the invention, in circuit arrangements for the addition of binary numbers having a stage for each order of the numbers to be added, controlling means provided in common to all the stages are adapted to render all stages simultaneously responsive to electrical conditions significant of the augend digits and subsequently to render all stages simultaneously responsive to electrical conditions significant of the addend digits and finally to render every stage except the first simultaneously responsive to an electrical condition significant of a carry digit from the preceding stage.

In each stage the electrical conditions serve to control the input to a binary pair of devices so arranged that one of said devices changes state on the count of "1" whereas the other of said devices changes state in response to a count of "1+1," the changed state of the first device providing a sum output relevant to the digit "1" and the changed state of the second device controlling the application of a carry digit of "1" to the stage of the next order.

In the preferred embodiment the binary pair of devices comprises a binary pair of cold cathode gas discharge tubes and the input to one of the tubes of the binary pair is obtained from the common anode load of three tubes of which the first strikes in response to an augend digit of "1," the second strikes in response to an addend digit of "1" and the third which is located in the stage of the next lower order strikes if a carry digit of "1" is to be transferred from said stage.

The invention will be better understood from the following description of the preferred method of carrying it into effect which should be read in conjunction with the accompanying drawing which shows one of the stages of a circuit for adding two binary numbers.

The complete adding circuit would incorporate a number of stages, identical with that shown, corresponding to one more than the number of digits in each binary number. Each stage comprises six cold-cathode gas discharge tubes VKN1, VKN2, VKC1, VKI, VKC10 and VKC and in the quiescent state of the circuit none of them are conducting. The first two tubes are gate tubes when are arranged to be biased or not over leads LB1 and LB2 respectively in accordance with the binary digits to be added, the digits having the same place in the binary numbers. Tubes VKC1 and VKC10, with the isolating tube VKI, form the counter proper, the first tube registering the count of "1" and the second the count of 10 i. e. "0 carry 1." Lead LI is the count indication lead for the stage, and its condition is determined in accordance with the response of counter tube VKC1. Thus with this tube conducting for the count of "1" a positive potential is applied to the lead whereas with the tube non-conducting, for the count of "0," the lead would be at earth potential.

Tube VKC is the gate tube for the "carry 1" output signal to the next higher denomination stage, and the two leads LRC1 and LTC1 are provided specifically for the "carry 1" function. A "carry 1" signal may be received over the former from the preceding stage whereas a similar signal may be transmitted by the stage shown to its immediate successor over lead LTC1. Lead LRC1 of the first stage would of course not be utilised, and means, for instance, the equivalent of the circuit involving tube VKC1, would be provided for deriving an indication according to the condition of the output "carry 1" lead LTC1 of the last stage.

The operation of the circuit for adding purposes is effected by closing, singly and successively, the switching devices, A, B and C which are shown as relay contacts but which may take any other suitable form such as static switching devices. The said switching devices are common to all the stages of the circuit, as are the contacts RS which are to be used in due course for resetting the various counters.

So-called pulsed H. T. which takes the form of alternate potentials of say positive 130 and 50 volts is received at lead PHT and is extended over individual resistors, of high value, to the anodes of tubes VKI in every stage. The instants at which contacts B and C close are arranged to occur in periods of high voltage at lead PHT.

Leads LB1 of the various stages of the adding circuit serve to apply a positive priming potential to the trigger electrode of the associated tube VKN1 if the value of the particular digit of one binary number of the pair to be added is "1," those leads appropriate to digit "0" being left unmarked. Likewise the digits of the second number of the pair are represented by the marking or otherwise of leads such as LB2 so that the tubes VKN2 of each stage are appropriately prepared.

When contacts A are momentarily closed, a potential which is 50 volts negative with respect to earth is connected over individual resistors to the cathode of tube VKN1 in each stage and this tube will fire if it has been primed by a digit "1" signal at its trigger electrode. Similarly the momentary closure of contacts B, after a short interval, applies negative 50 volts to the cathodes of the second number gate tubes VKN2 to fire those of the tubes which have been primed by digit "1" signals.

Tubes VKN1 and VKN2 of the stage share the same anode load resistor R1, which incidentally also serves the anode of the "carry 1" gate tube VKC of the previous stage if any, the anode of tube VKC in said stage extending over the relevant lead LTC1 to lead LRC1 of the later stage.

The firing of the primed tube VKN1 due to the negative pulse at its cathode, reduces the potential at its anode. Accordingly a negative going pulse is applied to the cathode of the counter tube VKC1 which is therefore rendered conducting by the firing of the trigger/cathode gap which initiates conduction of the main gap. When tube VKC1 has fired, its increased cathode potential causes tube VKI to be primed and lead LI to be marked by say positive 50 volts representative of the count of "1." Obviously if tube VKN1 in the stage is not primed the pulse applied by contacts A is ineffective, tube VKC1 remains non-conducting and the potential at lead LI remains at earth to represent the count of "0."

The momentary closing of contacts B effectively tests the gate tube VKN2 in each stage, the individual tubes being fired if they are primed by the digit "1" condition at their trigger electrodes. If tubes VKN1 had not been fired, the firing of the corresponding tube VKN2 at this juncture would bring about the firing of tube VKC1 along the lines described and with similar results. On the other hand if tube VKC1 has already been fired by tube VKN1, the firing of tube VKN2, in producing a negative pulse at the cathode of the primed tube VKI, causes the latter tube to be fired since lead PHT now has positive 130 volts connected thereto. Tube VKI remains conducting until the potential at lead PHT is reduced, but meantime the drop in potential across its anode resistor due to conduction causes a negative pulse to be applied to the cathode lead of tube VKC10 which is therefore fired. When tube VKC10 is fired, tube VKC1 is extinguished since the tubes are arranged as a mutually extinguishing pair, and moreover the rise in cathode voltage of tube VKC10 serves to prime tube VKC which is concerned with the "carry 1" operation to the next stage. The extinguishing of tube VKC1 of course removes the count of "1" indication (+50 v.) from lead LI.

It will thus be seen that at the end of the portion of the operating cycle involving the sequential operation of contacts A and B, the stage shown like all other stages will be set in accordance with the following table:

| | | | | |
|---|---|---|---|---|
| First binary digit | 0 | 0 | 1 | 1 |
| Second binary digit | 0 | 1 | 0 | 1 |
| Tubes conducting | Nil | VKC1 | VKC1 | VKC10 |

The second phase in the operation of the adding circuit is initiated by the momentary closure of contacts C which connect negative 50 volts to the cathodes of tubes VKC in every stage for the purpose of effecting the "carry 1" operation from stage to stage. Now when the contacts close, those stages which have been subjected to a 1+1 condition will have their VKC tubes already primed and consequently these tubes now fire. The firing of a tube VKC developes a potential difference across resistor R1 of the succeeding stage and as a result a negative pulse is passed to the cathode circuit of tubes VKC1 and VKI of that stage. In a stage receiving the "carry 1" condition, no tubes will be conducting if the initial addition gave the result "0," tube VKC1 will be conducting if the result were "1" or tube VKC10 will be conducting, together with tube VKC, if the result had been "0 carry 1."

If the first of these possibilities obtains the received "carry 1" condition fires tube VKC1 to give the requisite positive 50 volts indication at lead LI.

If the second possibility applies, tube VKI, already primed by tube VKC1 and at this time being in receipt of pulsed H. T. at its anode, is now rendered conducting by the negative pulse at its cathode. Tube VKI causes VKC10 to be fired and this extinguishes tube VKC1. Furthermore since contacts C are still closed the firing of tube VKC10 renders tube VKC conducting so that the "carry 1" condition is applied to the next higher denomination stage and this would advance a "carry 1" condition to its successor if the count of "1" were already registered.

If the third condition, namely the "0 carry 1" condition evidenced by condition of tubes VKC10 and VKC, exists in the stage receiving a "carry 1" condition, tube VKC1 therein is caused to fire. This extinguishes tube VKC10 and applies a marking to lead LI. It may be noted that the "carry 1" condition from the particular stage is not interfered with since this function has already been performed.

From all the foregoing it can be appreciated that each stage is capable of working out the following binary additions, meeting all possibilities, and presenting the appropriate indications for the results: 1+1=0 carry 1, 1+0=1, 0+1=1, 0+0=0, 1+1+carry 1=1 carry 1, 1+0+carry 1=0 carry 1, and 0+0+carry 1=1.

It will be appreciated by those skilled in the art that a multi-stage adding circuit of the type described will lend itself to the subtraction of one multi-digit binary number by the complement method since this receives itself into addition. Taking the simple case of the subtraction:

11001
01101
01100

The same result obtains if digit "1" is added to the sum of the first number and a number which is derived from the second by changing each digit "0" to "1" and vice versa, the carry digit to the last place in the sum being ignored. Thus:

11001
10010
01011 which by adding 1 becomes 01100.

The addition would be accomplished by a five stage circuit in the manner described, and to cater for the addition of "1" to the sum, a signal corresponding to a "carry 1" signal would be arranged to be connected at the appropriate time to lead LRC1 of the first stage.

I claim:

In combination in circuit arrangements for the addition of two binary numbers having a stage for each order of the numbers to be added, a plurality of binary circuits one for each stage, each binary circuit comprising first and second cold cathode gas discharge tubes connected to form a mutually extinguishing pair, input and output leads connected to said first tube and a third tube connected to both said first and second tubes, a first series of gate circuits one for each stage, first switching means operative to open all said first series of gate circuits simultaneously to apply electrical conditions to the input leads of the binary circuits of those stages corresponding to "1" digits of the augend, a second series of gate circuits one for each stage, second switching means operative subsequent to the operation of said first switching means to open all said second series of gate circuits simultaneously to apply electrical conditions to the input leads of the binary circuits of those stages corresponding to "1" digits of the addend, first carry leads one for each stage excepting the first and extending from the preceding stage to the input lead of the binary circuit, means responsive to the first application of an electrical condition representing a "1" digit to the input lead of a binary circuit for striking the first tube of the binary circuit whereby the third tube of the binary circuit is primed and an electrical condition representing a "1" digit is applied to the output lead of the binary circuit, means responsive to the second application of an electrical condition representing a "1" digit to the input lead of said binary circuit for striking successively said third and second tubes whereby said first tube is extinguished and the electrical condition representing a "1" digit is removed from said output lead, means for extinguishing said third tube, means responsive to the third application of an electrical condition representing a "1" digit to the input lead of said binary circuit for again striking said first tube and extinguishing said second tube, a third series of gate circuits one for each stage except the last stage, third switching means operative subsequent to the operation of said second switching means to open all said third series of gate circuits simultaneously, second carry leads extending between said third series of gate circuits and said first carry leads of the respective succeeding stages and means responsive to the opening of said third series of gate circuits in those stages in which the second tubes of the binary circuits are conducting for applying an electrical condition representative of a "1" digit to the respective second carry leads.

References Cited in the file of this patent

UNITED STATES PATENTS

| | | |
|---|---|---|
| 2,627,587 | Kohler | Feb. 3, 1953 |
| 2,655,598 | Eckert et al. | Oct. 13, 1953 |
| 2,719,670 | Jacobs et al. | Oct. 4, 1955 |

FOREIGN PATENTS

| | | |
|---|---|---|
| 1,023,795 | France | Dec. 30, 1952 |